(12) United States Patent
Festa et al.

(10) Patent No.: US 10,122,918 B2
(45) Date of Patent: Nov. 6, 2018

(54) SYSTEM FOR PRODUCING 360 DEGREE MEDIA

(71) Applicants: Maurizio Sole Festa, Miami, FL (US); Alexis Fernandez, Miami, FL (US)

(72) Inventors: Maurizio Sole Festa, Miami, FL (US); Alexis Fernandez, Miami, FL (US)

( * ) Notice: Subject to any disclaimer, the term of this patent is extended or adjusted under 35 U.S.C. 154(b) by 43 days.

(21) Appl. No.: 15/183,941

(22) Filed: Jun. 16, 2016

(65) Prior Publication Data

US 2017/0366748 A1    Dec. 21, 2017

(51) Int. Cl.
*H04N 5/232*    (2006.01)
*G02B 13/06*    (2006.01)
*H04M 1/02*    (2006.01)
*H04N 5/225*    (2006.01)

(52) U.S. Cl.
CPC ......... *H04N 5/23238* (2013.01); *G02B 13/06* (2013.01); *H04M 1/0254* (2013.01); *H04M 1/0264* (2013.01); *H04N 5/2252* (2013.01); *H04N 5/2254* (2013.01); *H04N 5/23216* (2013.01); *H04N 5/23293* (2013.01); *H04M 2250/52* (2013.01)

(58) Field of Classification Search
CPC ............. H04N 5/23238; H04N 5/2252; H04N 5/2254; H04N 5/23216; H04N 5/23293; H04M 1/0254; H04M 1/0264; H04M 2250/52; G02B 13/06
USPC ........ 348/38, 36, 39, 47, 48, 49, 50, 52, 54, 348/153, 158, 159, 207.1, 207.11, 208.1, 348/208.11, 224.1, 231.99, 231.9, 335, 348/341, 344, 360, 369, 373, 374, 376, 348/552, 564, 567, 714, 716, 719, 785, 348/831, 838; 359/366, 618, 725, 778, 359/805, 808, 810, 813, 819
See application file for complete search history.

(56) References Cited

U.S. PATENT DOCUMENTS

| | | | | |
|---|---|---|---|---|
| 7,453,517 B2 * | 11/2008 | Fujimoto | ............. | H04N 5/2253 348/374 |
| 8,730,299 B1 * | 5/2014 | Kozko | ................ | H04N 5/2254 348/38 |
| 9,007,431 B1 * | 4/2015 | Kozko | ................ | H04N 5/2254 348/38 |
| 9,335,509 B2 * | 5/2016 | O'Neill | .................... | G02B 7/14 |
| 2006/0109567 A1 * | 5/2006 | Chen | .................. | G02B 13/0065 359/696 |
| 2008/0019684 A1 * | 1/2008 | Shyu | .................... | G03B 17/245 396/332 |
| 2009/0002664 A1 * | 1/2009 | Tanitsu | ................ | G02B 3/0062 355/67 |
| 2009/0009650 A1 * | 1/2009 | Liu | .................... | G02B 13/0055 348/340 |
| 2012/0044368 A1 * | 2/2012 | Lin | ...................... | G02B 27/646 348/208.2 |

(Continued)

*Primary Examiner* — Michael Lee

(57) ABSTRACT

A system for producing a 360 degree media is provided. The system includes an adapter and a computer having a front camera facing in a first direction and a rear camera facing in a second direction. The first direction and the second direction are opposite one another. The adapter includes a front lens facing in the first direction and a rear lens facing in the second direction when the adapter is releasably attached to the computer. The front lens and the rear lens expand a capturable image of the front camera and the rear camera so that the computer may capture and produce the 360 degree media.

6 Claims, 4 Drawing Sheets

(56) References Cited

U.S. PATENT DOCUMENTS

| | | | | |
|---|---|---|---|---|
| 2012/0206565 A1* | 8/2012 | Villmer | .............. | H04N 5/23238 348/36 |
| 2013/0093858 A1* | 4/2013 | Lee | ...................... | G02B 27/283 348/49 |
| 2013/0120602 A1* | 5/2013 | Huang | .............. | H04M 1/72522 348/218.1 |
| 2013/0188943 A1* | 7/2013 | Wu | ........................ | G03B 17/17 396/419 |
| 2014/0055624 A1* | 2/2014 | Gaines | ................. | H04N 5/2254 348/207.1 |
| 2014/0218587 A1* | 8/2014 | Shah | ........................ | G03B 5/00 348/340 |
| 2016/0234442 A1* | 8/2016 | Pylkkanen | ............. | G03B 17/02 |
| 2017/0075092 A1* | 3/2017 | Kim | ........................ | G02B 13/06 |

* cited by examiner

SYSTEM FOR PRODUCING 360 DEGREE MEDIA

BACKGROUND OF THE INVENTION

The present invention relates to a system for producing 360 degree media and, more particularly, to an adapter and software that allows a smart device to capture and share 360 degree media.

Current smart phones cannot capture 360-degree spherical media content without the use of external wirelessly connected camera devices or special built in hardware that could limit device standard media capturing capabilities.

As can be seen, there is a need for an adapter and software that allows a smart device to capture 360 degree media.

SUMMARY OF THE INVENTION

In one aspect of the present invention, a system for producing 360 degree media comprises: an adapter comprising a front lens facing in a first direction and a rear lens facing in a second direction, wherein the first direction is opposite the second direction, and a computer comprising a processor, a memory, a user interface, a front camera, and a rear camera, wherein the adapter is releasably secured to the computer so that the front lens aligns with the front camera, and the rear lens aligns with the rear camera, wherein the front lens and the rear lens expand a capturable image of the front camera and the rear camera, wherein the processor receives a first captured image from the front camera and a second captured image from the second camera; and merges the first captured image with the second captured image to produce a 360 degree media.

In another aspect of the present invention, a smart phone adapter comprises: a frame comprising a front side and a rear side forming a channel in between, wherein the channel is sized to fit over a portion of and releasably secure to a smart phone; a front lens secured to the front side and facing in a first direction and a rear lens secured to the rear side and facing in a second direction, wherein the first direction is opposite the second direction, wherein the front lens and the rear lens are each a wide angle lens.

These and other features, aspects and advantages of the present invention will become better understood with reference to the following drawings, description and claims.

DETAILED DESCRIPTION OF THE INVENTION

Figure 1:
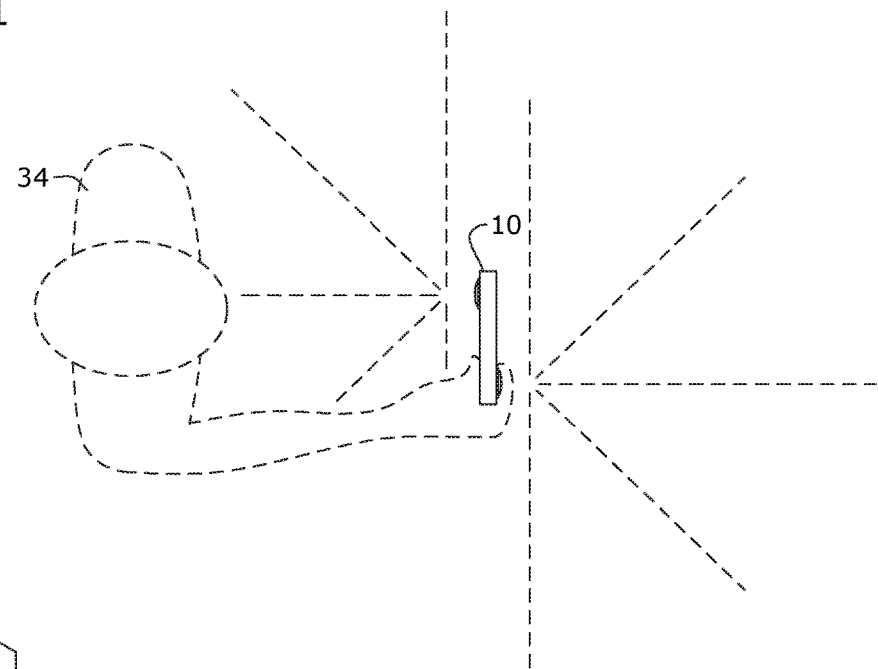
FIG. 1 is a schematic view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The present invention includes a universal lens adapter and software application to capture and share 360 degree media contents with any smart phone make or model. The present invention uses special software application in combination with special hardware adjustable afocal lens attachment and wide angle lens adapters. The front field and rear field cameras captured frames are adjusted and merged together to be rendered into 360 spherical media contents easily in one click.

The present invention aims to enable any smart phones to capture 360-degree spherical media contents with the use of a special software application in combination with special hardware adjustable afocal lens attachment and wide angle lens adapters. Using a smart phone equipped with front and rear cameras, an adapter is placed to correctly position an adjustable afocal lens attachment and wide angle lens system. Using the adapter z/y adjustment mechanism, adjustable afocal lens attachment and wide angle lens are aligned by a user to match the original smart phone camera lenses z and y axis. Through the adapter, x-adjustment mechanism adjusts focal distance and lens position along the x axis. The afocal lens attachment and wide angle lens system expands the smart phones front and rear field of views. The front and rear field of view is expanded to 185 degrees horizontally and vertically or to a wider angle to allow overlapping and merging into a 360 spherical media.

Synthesized media is rendered and saved into a 360 degree spherical media format. The saved files may be compiled with metadata including geo-positioning and orientation of media contents and prepared to be shared with other users within the application but also with users on a social network. The application allows for users to add comments to 360 degree generated media. The application may allow for 360 degree media contents to be viewed through the user interface viewing feed. The application may allow for content to be viewed in screen mode or virtual reality mode. In screen mode the generated media can be browsed by user by controlling the video with their fingers. In virtual reality mode contents can be viewed with the use of a virtual reality headset.

Figure 2:
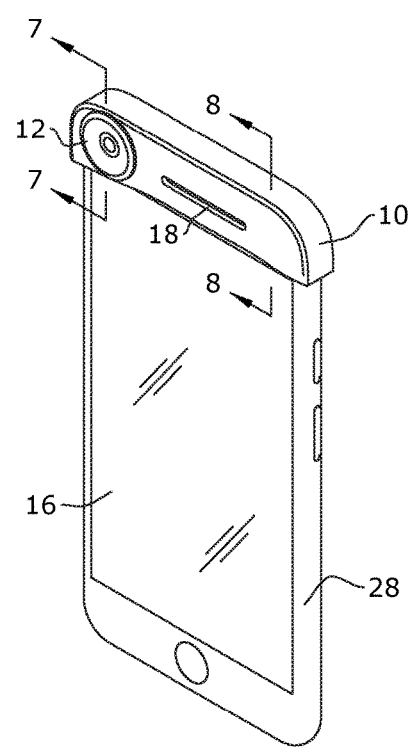
FIG. 2 is a perspective view of an embodiment of the present invention shown in use.
Figure 3:
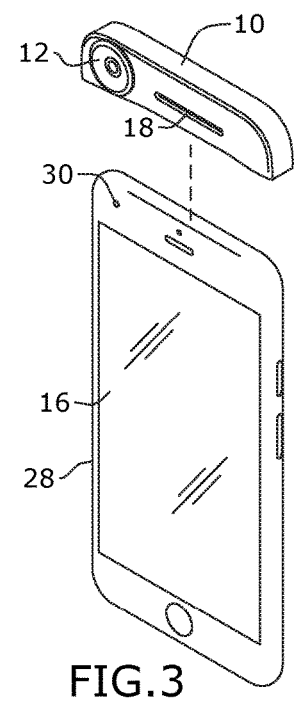
FIG. 3 is a perspective view illustrating the present invention removed from a smart phone.
Figure 4:
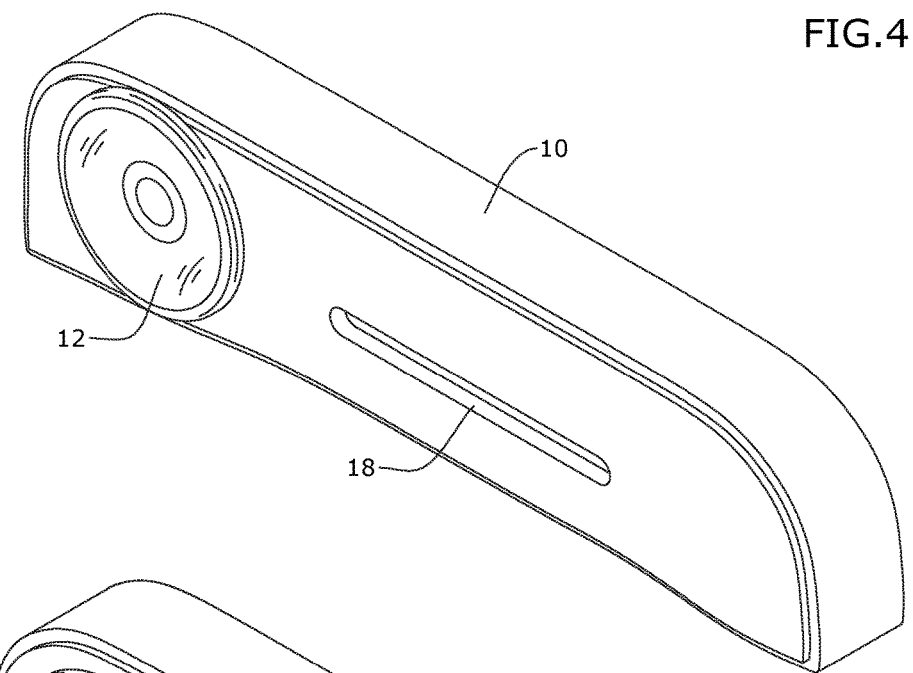
FIG. 4 is a front perspective view of an embodiment of the present invention.
Figure 5:
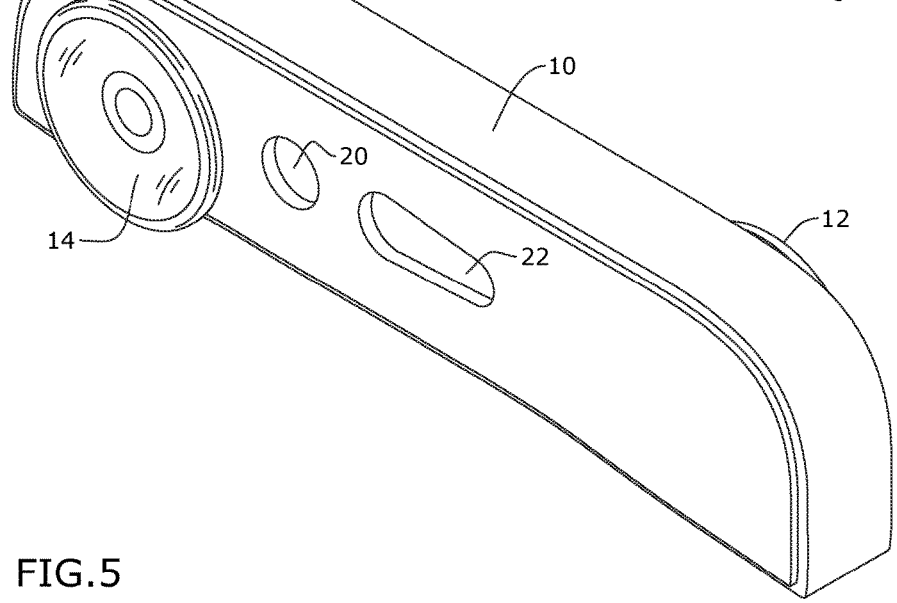
FIG. 5 is a back perspective view of an embodiment of the present invention.
Figure 6:
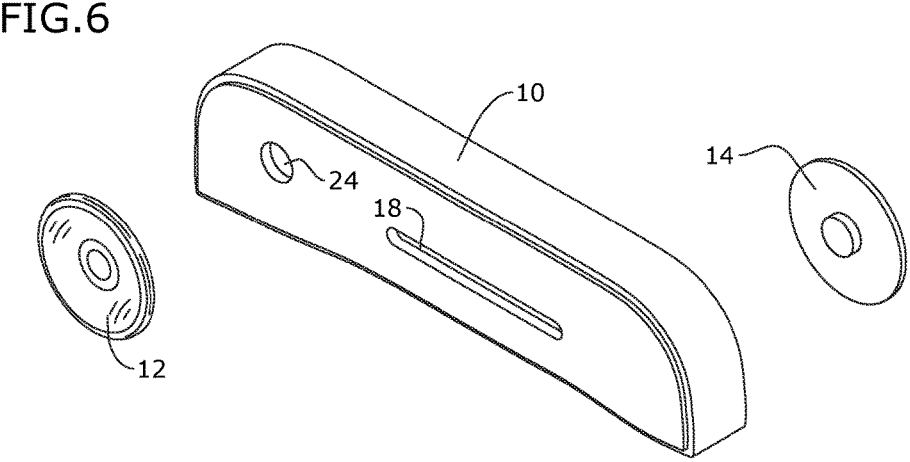
FIG. 6 is an exploded view of an embodiment of the present invention.
Figure 7:
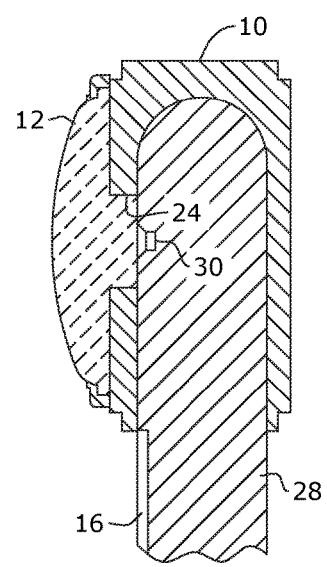
FIG. 7 is a section view of an embodiment of the present invention taken along 7-7 in FIG. 2.
Figure 8:
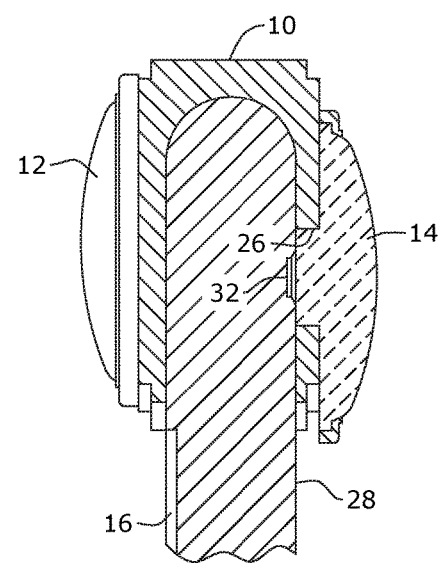
FIG. 8 is a section view of an embodiment of the present invention taken along 8-8 in FIG. 2.
Figure 9:
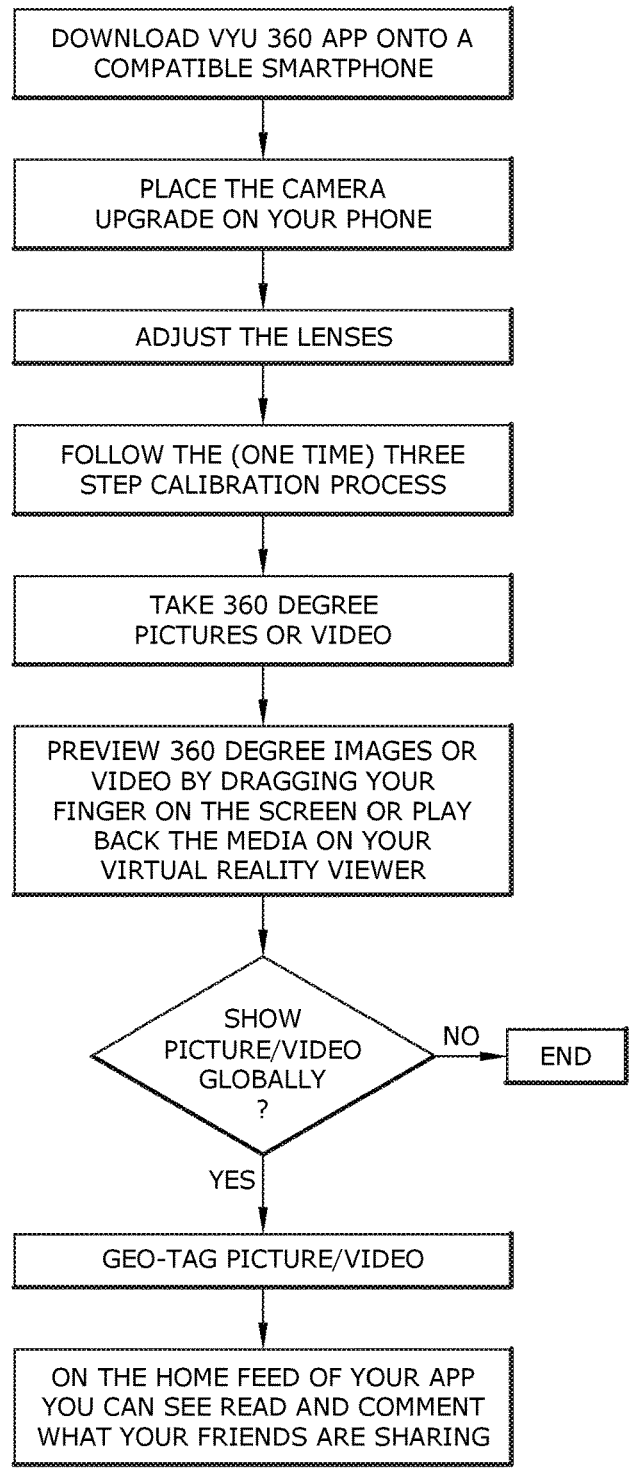
FIG. 9 is a flow chart of how to use an embodiment of the present invention.

Referring to FIGS. 1 through 9, the present invention includes a system for producing a 360 degree media. The system includes an adapter 10 and a computer 28 having a front camera 30 facing in a first direction and a rear camera 32 facing in a second direction. The first direction and the second direction are opposite one another. The adapter 10 includes a front lens 12 facing in the first direction and a rear lens 14 facing in the second direction when the adapter 10 is releasably attached to the computer 28. The front lens 12 and the rear lens 14 expand a capturable field of view of the front camera 30 and the rear camera 32 so that the computer 28 may capture and produce the 360 degree media. The computer 28 may be a smart phone or other type of smart device.

The adapter 10 of the present invention may include a frame having a front side and a rear side. The front side may include a front lens opening 24 and a speaker opening 18. The front lens 12 is secured within the front lens opening 24. The speaker opening 18 aligns with a front speaker of the smart phone. The rear side may include a rear lens opening 26, a flash opening 20, and a speaker opening 22. The rear lens 14 is secured within the rear lens opening 26. The speaker opening 18 aligns with a front speaker and the flash opening 20 aligns with the flash of the smart phone.

The front lens 12 and the rear lens 14 of the adapter 10 may each include a wide angle lens that provides a viewing angle of 180 degrees or higher in at least a horizontal direction. The wide angle lens includes a lens whose focal length is substantially smaller than the focal length of a normal lens which allows more of the scene to be included. The wide angle focal length may have variable range. The wide angle lens viewing angle is substantially larger than a viewing angle of the front camera 30 and the rear camera 32 of computer 28. Therefore, the front lens 12 and the rear lens 14 increases the capturable field of view of the front and rear cameras 30, 32 along at least the x axis. The front lens 12 and the rear lens 14 allow the front camera 32 and the rear camera 32 to each capture more than 180 degrees, such as about 185 degrees or more of imagery.

In certain embodiments, the wide angle lens may be an ultra wide angle lens. The ultra wide angle lens creating a wide panoramic or hemispherical image. The ultra wide angle lens may have a variable focal length and captures more than a 180 degrees of field of view. The ultra wide angle lens may include a convex outer surface.

The front lens 12 and the rear lens 14 may each further include an afocal lens. An afocal lens is an optical lens that produces no net convergence or divergence of the beam, i.e. has an infinite effective focal length. This type of system can be created with a pair of optical elements where the distance between the elements is equal to the sum of each element's focal length. The afocal lens automatically adjusts to the focus of the camera lenses of the computer 28.

The computer 28 of the present invention may include a processor, a memory and a user interface. In certain embodiments, the computer 28 may include a smart phone with a microprocessor and a touch screen interface 16. Software, such as an application, may run on the smart device. The software is used to adjust and merge the images captured by the front and rear camera 30, 32. Using the software, a user 34 may press a button on the touch screen interface 16 to capture an image via the front camera 30 and the rear camera 32. The software may direct the processor to merge the first captured image with the second captured image to produce the 360 degree media.

Because each smart phone model uses different camera sensors and camera optics combination, the application may first request that the user 34 tunes the adaptor 10 with the cameras 30, 32 to prepare the system before producing the 360 degree media. During the initial tuning step, the user 34 controls and adjusts tuning parameters through the user interface. Tuning may be a onetime process that is performed so that field of view images are perfectly aligned and ready to be merged seamlessly.

To perform the tuning process on the smart phone, semi spherical images from camera 30, 32 are displayed to the user 34. The user interface on the application shows a merging boundaries outline over imposed to the front and rear images. The user 34 can zoom in and out to adjust the boundaries between the front and rear images. The application may detect the best alignment and notify the user 34 when the tuning is complete. The preset tune may be saved on the memory of the smart phone. Additionally, parametric blurring, color correction, gamma, exposure, contrast and tone coefficient values can be adjusted during tuning phase to help reach best blending results within merging frame areas.

Once tuning has been completed, the user interface may prompt the user 34 to capture images via a capture button. A preview of the images are displayed onto the screen 16 of the user interface. The user 34 may select the capture button to capture the images. Once the images have been captured, the process merges the images to form the 360 spherical media, which may be saved to the memory. The merging process may include the following. The images may be de-warped, i.e. changed in shape from circular to rectangular. The first captured image is split, aligned and merged to the second captured image. For example, the first captured image is adjusted to include a 180 degree view and the second captured image is adjusted to include a 180 degree view not within the first captured image. The first and second captured images are merged into the 360 degree media. The 360 degree spherical media is then synthesized into an equirectangular spherical projection. The 360 degree media may be in the form of a still image or a video (moving) image.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A system for producing 360 degree media comprising:
an adapter comprising a frame comprising a front side and a rear side forming a channel in between, a front lens comprising a first wide angle lens and a first afocal lens, and a rear lens comprising a second wide angle lens and a second afocal lens, wherein the front lens is secured to the front side and faces in a first direction and the rear lens is secured to the rear side and faces in a second direction, wherein the first direction is opposite the second direction, and a computer comprising a processor, a memory, a user interface, a front camera comprising a front camera lens, and a rear camera comprising a rear camera lens, wherein the channel of the adapter fits over and releasably secures to a portion of the computer so that the front lens covers the front camera lens, and the rear lens covers the rear camera lens, wherein the front lens and the rear lens expand a capturable field of view of the front camera and the rear camera, wherein the processor receives a first captured image from the front camera and a second captured image from the second camera; and merges the first captured image with the second captured image to produce a 360 degree media.

2. The system of claim 1, wherein the front lens and the rear lens each comprise a convex outer surface.

3. The system of claim 1, wherein the front lens and the rear lens allow the front camera and the rear camera to each capture more than about 180 degrees of imagery.

4. The system of claim 1, wherein the processor
adjusts the first captured image to comprise a 180 degree view;
adjusts the second capture image to comprise a 180 degree view not within the first captured image; and
merges the first captured image with the second captured image to form the 360 degree view.

5. The system of claim 1, wherein the computer is a smart phone.

6. The system of claim 1, wherein the first captured image and the second captured image comprise a still image or a video image.

* * * * *